(12) United States Patent
Wu

(10) Patent No.: US 12,512,102 B2
(45) Date of Patent: Dec. 30, 2025

(54) PROVIDING PROMPTS IN SPEECH RECOGNITION RESULTS IN REAL TIME

(71) Applicant: Microsoft Technology Licensing, LLC, Redmond, WA (US)

(72) Inventor: Kun Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 17/926,291

(22) PCT Filed: Apr. 21, 2021

(86) PCT No.: PCT/US2021/028277
§ 371 (c)(1),
(2) Date: Nov. 18, 2022

(87) PCT Pub. No.: WO2021/247155
PCT Pub. Date: Dec. 9, 2021

(65) Prior Publication Data
US 2023/0215441 A1    Jul. 6, 2023

(30) Foreign Application Priority Data

Jun. 4, 2020   (CN) .......................... 202010517639.2

(51) Int. Cl.
*G06F 3/023*   (2006.01)
*G10L 17/14*   (2013.01)
(Continued)

(52) U.S. Cl.
CPC .............. *G10L 17/22* (2013.01); *G10L 17/14* (2013.01); *G10L 17/18* (2013.01); *G06F 3/0237* (2013.01)

(58) Field of Classification Search
CPC .................................................. G06F 3/0237
See application file for complete search history.

(56) References Cited

U.S. PATENT DOCUMENTS

| 7,562,288 B2 | 7/2009 | Dittrich |
| 9,626,955 B2 | 4/2017 | Fleizach et al. |

(Continued)

FOREIGN PATENT DOCUMENTS

| CN | 112395412 A * | 2/2021 | ............. G06F 16/35 |
| EP | 1160767 A2 | 12/2001 | |
| EP | 3657501 A1 | 5/2020 | |
| WO | WO 2008064137 A3 * | 11/2007 | |
| WO | 2017112813 A1 | 6/2017 | |

OTHER PUBLICATIONS

James, et al., "Text Input for Mobile Devices: Comparing Model Prediction to Actual Performance," CHI 2001. (Year: 2001).*

(Continued)

*Primary Examiner* — Feng-Tzer Tzeng
(74) *Attorney, Agent, or Firm* — Schwegman Lundberg & Woessner, P.A.

(57) ABSTRACT

The present disclosure provides methods and apparatuses for providing prompts in speech recognition results in real time. A current speech input in an audio stream for a target event may be obtained. A current utterance text corresponding to the current speech input may be identified. A prompt may be generated based at least on the current utterance text, the prompt comprising at least one predicted subsequent utterance text sequence. A speech recognition result for the current speech input may be provided, the speech recognition result comprising the current utterance text and the prompt.

18 Claims, 8 Drawing Sheets

(51) Int. Cl.
*G10L 17/18* (2013.01)
*G10L 17/22* (2013.01)

(56) References Cited

U.S. PATENT DOCUMENTS

| | | | |
|---|---|---|---|
| 10,366,149 B2 | 7/2019 | Wolfram et al. | |
| 11,341,331 B2 | 5/2022 | Liao et al. | |
| 2008/0072143 A1* | 3/2008 | Assadollahi | G06F 3/0236 715/261 |
| 2010/0185447 A1 | 7/2010 | Krumel | |
| 2011/0197128 A1* | 8/2011 | Assadollahi | G06F 3/0237 715/259 |
| 2012/0173222 A1* | 7/2012 | Wang | G06F 40/274 715/708 |
| 2014/0297267 A1* | 10/2014 | Spencer | G06F 3/04886 704/9 |
| 2015/0089435 A1* | 3/2015 | Kuzmin | G06F 3/0488 715/773 |
| 2016/0275070 A1* | 9/2016 | Corston | G06F 40/253 |
| 2016/0328377 A1* | 11/2016 | Spencer | G06F 3/04886 |
| 2016/0364087 A1 | 12/2016 | Thompson et al. | |
| 2018/0150143 A1* | 5/2018 | Orr | G06N 3/084 |
| 2020/0019308 A1* | 1/2020 | Medlock | G06F 3/0237 |
| 2020/0098366 A1 | 3/2020 | Chakraborty | |
| 2021/0089860 A1* | 3/2021 | Heere | G06N 20/00 |

OTHER PUBLICATIONS

James, et al., "Text Input for Mobile Devices: Comparing Model Prediction to Actual Performance," CHI 2001. (Year: 2001)—see attached reference in the previous Office action. (Year: 2001).*

James, et al., "Text Input for Mobile Devices: Comparing Model Prediction to Actual Performance," CHI 2001—see attached reference in the 1st Office action. (Year: 2001).*

"Ali Linger", Retrieved From: https://ai.aliyun.com/, Mar. 18, 2020, 3 Pages.

Yoshioka, et al., "Advances in Online Audio-Visual Meeting Transcription", In Repository of arXiv:1912.04979v1, Dec. 10, 2019, 8 Pages.

"Speech Service Documentation", Retrieved From: https://learn.microsoft.com/en-us/azure/cognitive-services/Speech-Service/, May 16, 2018, 3 Pages.

Asadi, et al., "IntelliPrompter: Speech-based Dynamic Note Display Interface for Oral Presentations", In Proceedings of the 19th ACM International Conference on Multimodal Interaction, Nov. 13, 2017, pp. 172-180.

Fasbinder, Fia, "5 Public Speaking Apps to Perfect Your Next Presentation", Retrieved From: https://www.inc.com/fia-fasbinder/need-to-nail-your-next-speech-theres-an-app-for-th.html, Jul. 24, 2017, 6 Pages.

"International Search Report and Written Opinion Issued in PCT Application No. PCT/US2021/028277", Mailed Date: Aug. 4, 2021, 13 Pages.

Office Action Received for Chinese Application No. 202010517639.2, mailed on Feb. 27, 2024, 19 pages (English Translation Provided).

Communication under Rule 71(3) received in European Application No. 21724481.3 mailed on Aug. 30, 2024, 8 pages.

Decision to Grant pursuant to Article 97(1) received in European Application No. 21724481.3, mailed on Jan. 8, 2025, 2 pages.

Notice of Allowance Received for Chinese Application No. 202010517639.2, mailed on Mar. 25, 2025, 08 pages (English Translation Provided).

Second Office Action Received for Chinese Application No. 202010517639.2, mailed on Dec. 18, 2024, 23 pages (English Translation Provided).

\* cited by examiner

PROVIDING PROMPTS IN SPEECH RECOGNITION RESULTS IN REAL TIME

CROSS-REFERENCE TO RELATED APPLICATION

This application is a U.S. National Stage Filing under 35 U.S.C. 371 of International Patent Application Serial No. PCT/US2021/028277, filed Apr. 21, 2021, and published as WO 2021/247155 A1 on Dec. 9, 2021, which claims priority to Chinese Application No. 202010517639.2, filed Jun. 4, 2020, which applications and publication are incorporated herein by reference in their entirety.

BACKGROUND

Speech recognition technique aims to convert speech signals into text information. For example, through performing speech recognition, acoustic features may be extracted from a speech waveform, and the acoustic features may then be mapped into text corresponding to the speech waveform. The speech recognition technique has been widely applied in various scenarios.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for providing prompts in speech recognition results in real time. A current speech input in an audio stream for a target event may be obtained. A current utterance text corresponding to the current speech input may be identified. A prompt may be generated based at least on the current utterance text, the prompt comprising at least one predicted subsequent utterance text sequence. A speech recognition result for the current speech input may be provided, the speech recognition result comprising the current utterance text and the prompt.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to comprise all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
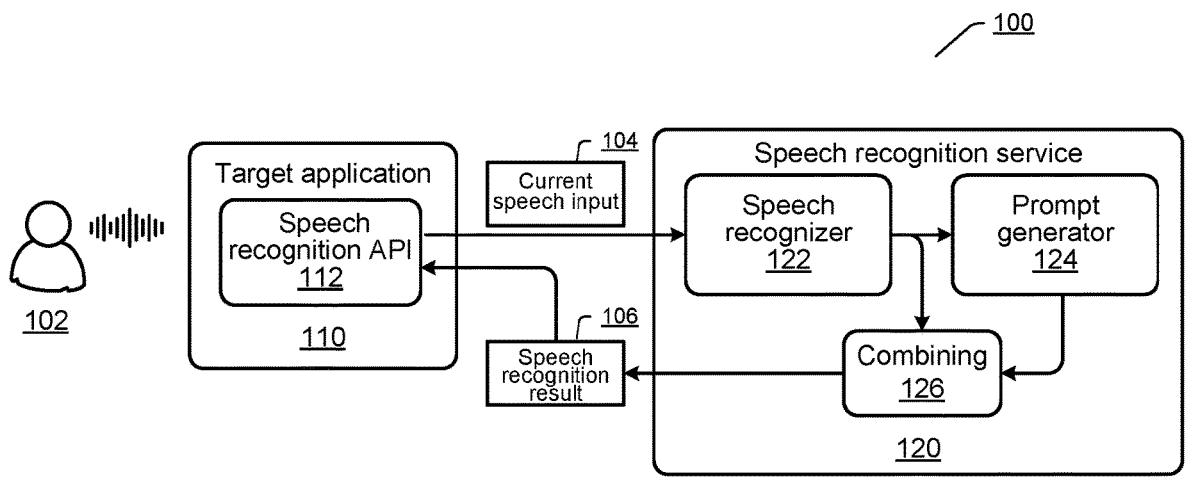
FIG. 1 illustrates an exemplary architecture of deployment of a speech recognition service according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Existing speech recognition techniques may provide texts corresponding to input speech waveforms in speech recognition results. In the case of performing real-time speech recognition, speech in an audio stream may be converted into text in real time. Some software applications may support the invoking of a real-time speech recognition function, e.g., remote conference system, social networking application, slideshow application, etc. When a user uses these software applications and provides a speech input in the form of audio stream or speaks an utterance by speech, the real-time speech recognition function may convert the speech in the audio stream into an utterance text sequence in real time as a speech recognition result, and the utterance text sequence may be presented to the user or other users for indicating, in the form of text, the content spoken by the speaker. The speech recognition result provided by the real-time speech recognition function may comprise an utterance text identified from the current speech input and possibly an utterance text identified from the previous speech input.

The embodiments of the present disclosure propose to provide prompts in speech recognition results in real time, the prompts including prediction for content of possible subsequent utterances. Thus, a speech recognition result may not only present a current utterance text identified from a current speech input, but also present a predicted subsequent utterance text. Taking a user using a slideshow application to give a lecture as an example, not only an utterance text corresponding to a speech utterance currently spoken by the user may be presented in the slideshow application through speech recognition, but also text of an utterance that is likely spoken next by the user may be presented in real time in the form of prompt. For the user as a speaker, the prompt may facilitate to remind the speaker what content to speak next, avoid omitting content, avoid misspeaking content, etc., thus making the whole speaking process more accurate and smooth. For audience, the prompt may help them to understand in advance what content will be heard next, so that they may better understand the speaker's intention. Moreover, the prompt may also comprise utilizing the predicted subsequent utterance text to correct omissions or errors in the utterance actually spoken by the speaker, thereby further helping the audience to understand. It should be understood that, herein, an utterance may comprise one or more words.

In an aspect, a corresponding prompt may be provided in real time as a current speech input in an audio stream is identified. For example, whenever a speaker speaks one or more words, a prompt in response to the current word is provided. Herein, a word may broadly refer to a language unit in different languages, e.g., a character in Chinese, a word in English, etc. Moreover, herein, depending on specific implementation of speech recognition, a word may broadly comprise one or more characters, one or more words, one or more phrases, etc.

In an aspect, a prompt may comprise one or more predicted subsequent utterance text sequences, each predicted subsequent utterance text sequence may comprise one or more predicted subsequent utterance texts, and each predicted subsequent utterance text may comprise one or more words. Different numbers of predicted subsequent utterance texts included in each sequence may provide different prediction spans.

In an aspect, the prompt generating process may be based on a current utterance text identified for a current speech input. For example, a subsequent utterance text sequence may be predicted based at least on the current utterance text. Moreover, the prompt generating process may further consider one or more identified previous utterance texts. For example, a subsequent utterance text sequence may be predicted based at least on the current utterance text and at least one previous utterance text.

In an aspect, the prompt generating process may consider various factors that facilitate to improve prompt accuracy. For example, the prompt generating process may consider an event identity (ID) of a target event. The target event may refer to an event aimed by an audio stream or speech inputs. Taking multiple participants using a remote conference system to conduct discussions on improving efficiency of productivity tools as an example, a target event may be <discussion on improving efficiency of productivity tools>, and speech utterances from these participants in an audio stream may be considered as aiming at the target event. Through utilizing an event ID of the target event in the prompt generating process, the prompt may be generated in an approach more adaptive for the target event. Herein, an event ID is an identity used for distinguishing among different events, which may adopt various approaches such as character string, numeric value, vector, etc. Moreover, for example, the prompt generating process may consider a speaker ID of a speaker of a current speech input. Through utilizing the speaker ID of the speaker in the prompt generating process, the prompt may be generated in an approach more adaptive for the speaker. Herein, a speaker ID is an identity used for distinguishing among different speakers, which may adopt various approaches such as character string, numeric value, vector, etc. It should be understood that, in addition to considering an event ID and a speaker ID, the prompt generating process may also consider any other factor that facilitates to improve the prompt accuracy.

In an aspect, a prompt generator may be previously-established for performing prompt generation. In one situation, a document associated with a target event may be used for establishing a prompt generator, to achieve prompt generator customization for the target event. Optionally, event information associated with the target event may be further used for establishing the prompt generator. In one situation, a plurality of documents respectively associated with a plurality of events may be used for establishing a prompt generator, to make the prompt generator have higher universality. Optionally, event information associated with each of the plurality of events may be further used for establishing the prompt generator. In one situation, a plurality of documents respectively associated with a plurality of speakers may be used for establishing a prompt generator, to achieve prompt generator customization for specific speakers. Optionally, a speaker ID associated with each speaker may be further used for establishing the prompt generator. Moreover, all the above situations may also be combined to establish a prompt generator that has both universality and customization. The prompt generator may be established based on various text prediction techniques, e.g., neural network model, relevance matrix, etc. In the application stage, the established prompt generator may predict a subsequent utterance text sequence based at least on a current utterance text and an optional previous utterance text.

In an aspect, a current utterance text and a prompt may be provided in different presentation approaches in a speech recognition result, so as to visually distinguish the current utterance text and the prompt. Herein, the presentation approaches may refer to, e.g., font, font size, color, bold, italic, underline, layout position, etc.

Through providing prompts in speech recognition results in real time according to the embodiments of the present disclosure, an improved speech recognition service may be achieved, so that speech recognition results contain richer information, thus improving usage efficiency and product effects of related software applications, improving user experience of both speaker and audience, etc.

FIG. 1 illustrates an exemplary architecture 100 of deployment of a speech recognition service according to an embodiment. In the architecture 100, a speech recognition result including a prompt that is generated according to the embodiments of the present disclosure is directly provided to a target application operated by a terminal user, so that the terminal user may obtain an improved speech recognition service.

It is assumed that a user 102 is a terminal user of a target application 110. The target application 110 may be various software applications that support the invoking of a speech recognition function, e.g., remote conference system, social networking application, slideshow application, etc. The target application 110 may comprise a speech recognition application programming interface (API) 112, and the speech recognition API 112 may invoke a speech recognition service 120 to obtain a speech recognition function. For example, during the user 102 is using the target application 110, if the user 102 wants to enable the speech recognition function, the user may trigger the speech recognition API 112 through, e.g., a control button in a user interface (UI). Moreover, optionally, the speech recognition API 112 may also be enabled by default or preset to be enabled by a provider of the target application 110.

The speech recognition service 120 may generally refer to various functional entities capable of implementing a speech recognition function, e.g., a speech recognition platform or server independent of the target application 110, a speech recognition module included in the target application 110, etc. Therefore, although the speech recognition service 120 and the target application 110 are shown in different blocks in FIG. 1 for ease of explanation, it should be understood that the speech recognition service 120 may be independent of the target application 110 or included in the target application 110. Moreover, the speech recognition service 120 is an improved speech recognition service that is capable of providing prompts in speech recognition results in real time.

When the user 102 provides a series of speech inputs in the form of audio stream, e.g., when the user 102 speaks utterances by speech, the speech recognition API 112 may provide a current speech input 104 in the audio stream to a speech recognizer 122 in the speech recognition service 120. The speech recognizer 122 may adopt any known speech recognition technique to convert the current speech input 104 into a corresponding current utterance text.

A prompt generator 124 in the speech recognition service 120 may generate a prompt based at least on the current utterance text output by the speech recognizer 122 according to the embodiments of the present disclosure. The prompt may comprise at least one predicted subsequent utterance text sequence.

A combining module 126 in the speech recognition service 120 may combine the current utterance text output by the speech recognizer 122 and the prompt output by the prompt generator 124, to form a speech recognition result 106 corresponding to the current speech input 104. Optionally, the combining module 126 may adopt different presentation approaches to combine the current utterance text and the prompt.

The speech recognition result 106 including the prompt may be returned to the speech recognition API 112. Thus, the target application 110 may present the speech recognition result 106 in the UI to the user 102 and others who may see the UI. It should be understood that in the case that the target application 110 is a multi-party application that is allowable to be run by different users on their respective terminal devices simultaneously, e.g., in the case that the target application 110 is a remote conference system that allows multiple participants to run clients on their respective terminal devices respectively, the speech recognition result 106 may be provided to different terminal devices running the target application 110 at the same time, so that different users may all view the speech recognition result.

Figure 2:
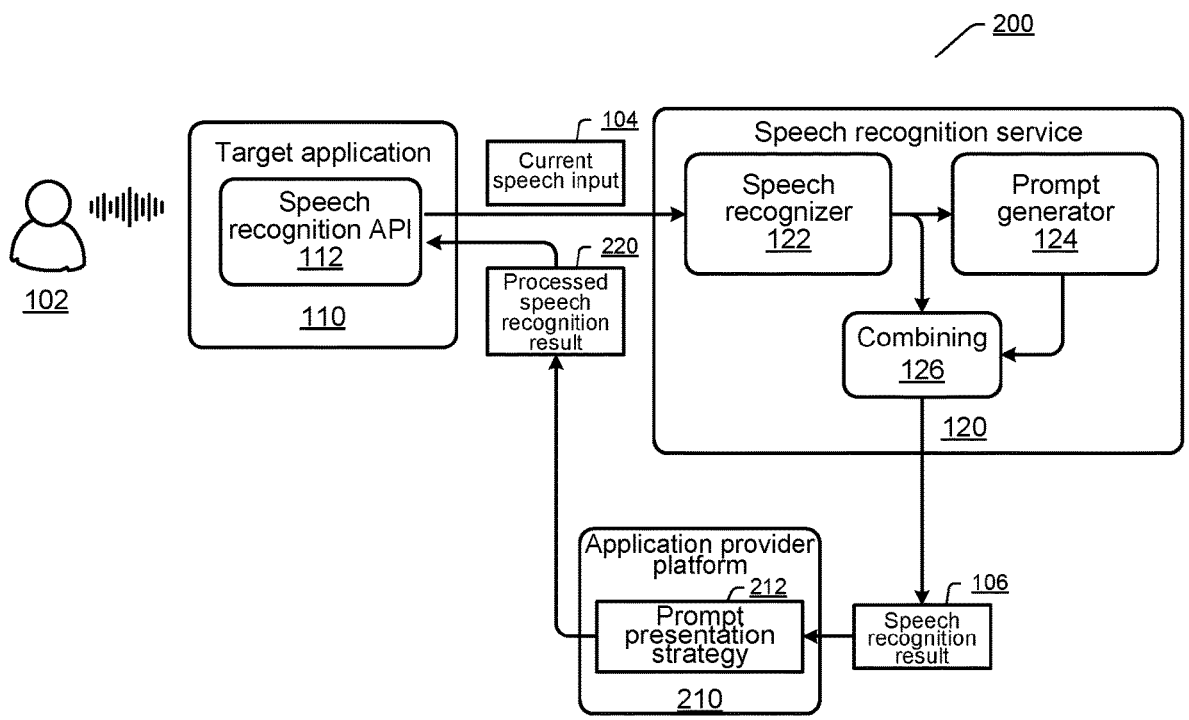
FIG. 2 illustrates an exemplary architecture of deployment of a speech recognition service according to an embodiment.

FIG. 2 illustrates an exemplary architecture 200 of deployment of a speech recognition service according to an embodiment. The architecture 200 is a modification on the basis of the architecture 100 in FIG. 1, and the same reference numerals in FIG. 1 and FIG. 2 may indicate the same elements or functions. In the architecture 200, a speech recognition result including a prompt that is generated according to the embodiments of the present disclosure is first provided to an application provider platform, and after being processed by the application provider platform, a processed speech recognition result is provided to a target application operated by a terminal user.

As shown in FIG. 2, the speech recognition service 120 may provide the speech recognition result 106 including a prompt to an application provider platform 210. The application provider platform 210 may refer to a network entity capable of providing, e.g., operations control, service management, data processing, development, etc., for the target application 110. Assuming that the target application 110 is a remote conference system, the application provider plat-form 210 may be, e.g., a server of the remote conference system. The application provider platform 210 may process the speech recognition result 106 based on a predefined prompt presentation strategy 212, to generate a processed speech recognition result 220. The prompt presentation strategy 212 may control what content in the prompt in the speech recognition result 106 will be presented to the user 102 and in what approach the prompt will be provided in the processed speech recognition result 220. For example, the prompt in the speech recognition result 106 may comprise a plurality of predicted subsequent utterance text sequences, and the prompt presentation strategy 212 may determine that only the highest-ranked predicted subsequent utterance text sequence is included in the processed speech recognition result 220. For example, the prompt presentation strategy 212 may define desired presentation approaches of the current utterance text and the prompt in the processed speech recognition result 220.

The processed speech recognition result 220 may be returned to the speech recognition API 112. Thus, the target application 110 may present the processed speech recognition result 220 in the UI.

According to the architecture 200, through providing the speech recognition result output by the speech recognition service to the application provider platform and forming, in the application provider platform, the final speech recognition result to be presented, the provider of the target application may autonomously set a strategy on how to provide prompts in speech recognition results. Thus, the application provider platform may obtain customization through a predefined prompt presentation strategy. Accordingly, in fact, the application provider platform is a "platform user" that directly obtains the improved speech recognition service, and the user 102 is a "terminal user" that indirectly obtains the improved speech recognition service.

It should be understood that although it is shown in the architecture 200 that the prompt presentation strategy 212 is included in the application provider platform 210, optionally, the prompt presentation strategy 212 may also be deployed in the target application 110. Thus, the target application 110 may receive the speech recognition result 106, and after processing the speech recognition result 106 according to the prompt presentation strategy 212, may present the processed speech recognition result in the UI. Moreover, it should be understood that although the processed speech recognition result is finally presented in the UI of the target application 110 in the architecture 200, the speech recognition function may also be invoked by the target application 110 in the background, so that the target application platform 210 may not return the processed speech recognition result to the target application 110. In this case, the target application platform 210 may serve as a target receiving endpoint of the speech recognition result 106, and may further take advantage of the speech recognition result 106.

It should be understood that FIG. 1 and FIG. 2 only show exemplary architectures of deployment of the speech recognition service, and depending on actual application scenarios, the embodiments of the present disclosure may also cover any other deployment architecture.

Figure 3:
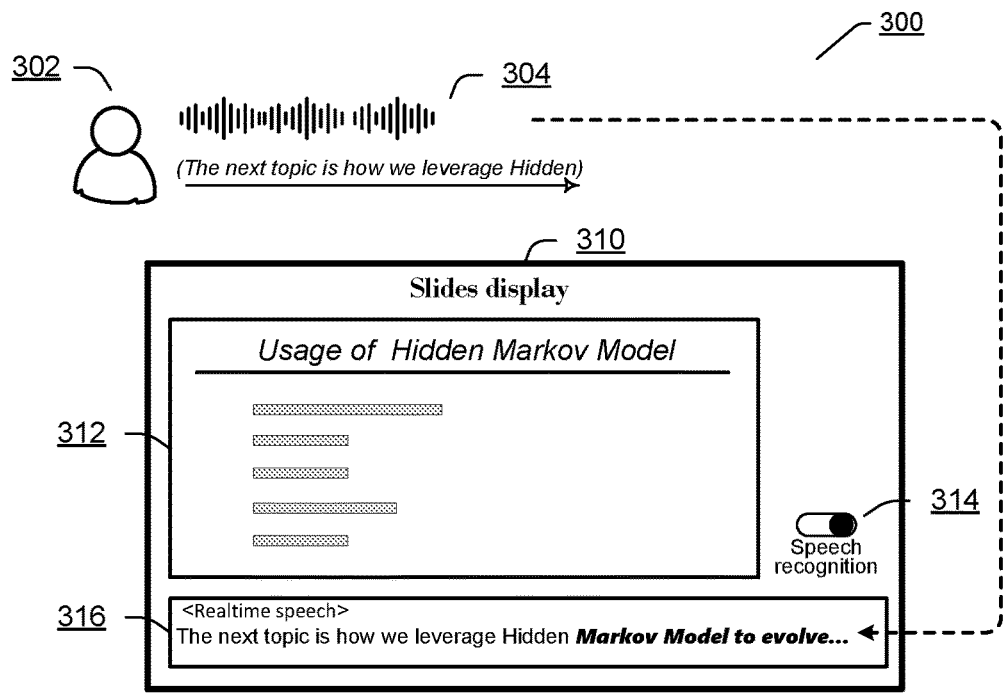
FIG. 3 illustrates an exemplary scenario of providing prompts in speech recognition results in real time according to an embodiment.

FIG. 3 illustrates an exemplary scenario 300 of providing prompts in speech recognition results in real time according to an embodiment. It is assumed that a terminal user 302 is using a slideshow application, and the slideshow application has an exemplary UI 310.

The UI 310 may comprise a display area 312 in which content of slides are displayed. The UI 310 may comprise a speech recognition button 314 which is used for invoking a speech recognition function. The UI 310 may also comprise a speech recognition result area 316 for displaying speech recognition results of speech utterances in real time.

It is assumed that a user 302 is speaking utterances by speech while showing slides, and thus a corresponding audio stream 304 is produced. As an example, the user 302 speaks "The next topic is how we leverage Hidden" in English, wherein "Hidden" is the current speech input. Through the improved speech recognition service according to the embodiments of the present disclosure, the speech recognition result area 316 may display a plurality of previous utterance texts "The next topic is how we leverage", an identified current utterance text "Hidden", and a prompt "Markov Model to evolve". The prompt comprises a predicted subsequent utterance text sequence which includes 4 predicted subsequent utterance texts "Markov", "Model", "to" and "evolve". In other words, even though the user 302 just said the word "Hidden", the speech recognition result area 316 has already displayed a prediction of an utterance that the user 302 may speak next.

As shown in FIG. 3, the prompt is provided in a different presentation approach from the previous utterance texts and the current utterance text. For example, the texts "Markov Model to evolve" in the prompt are presented in an approach of different font, bold and italic.

Figure 4:
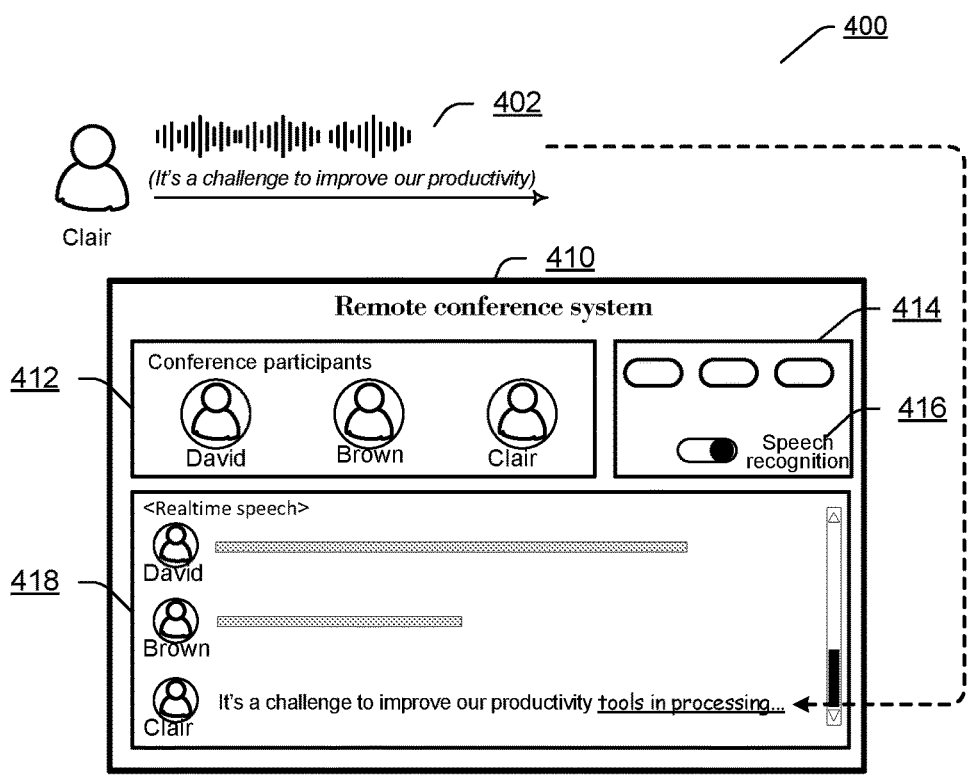
FIG. 4 illustrates an exemplary scenario of providing prompts in speech recognition results in real time according to an embodiment.

FIG. 4 illustrates an exemplary scenario 400 of providing prompts in speech recognition results in real time according to an embodiment. It is assumed that a terminal user Clair is using a remote conference system, and the remote conference system has an exemplary UI 410.

The UI 410 may comprise an information area 412 in which participants of the conference are listed, e.g., David, Brown, Clair, etc. The UI 410 may comprise a control area 414 which includes a plurality of control buttons for implementing different control functions. The control area 414 may comprise a speech recognition button 416 which is used for invoking a speech recognition function. The UI 410 may further comprise a speech recognition result area 418 for displaying speech recognition results of speech utterances of different participants in the conference in real time.

It is assumed that the user Clair is speaking utterances by speech, and thus a corresponding audio stream 402 is produced. As an example, the user Clair speaks "It's a challenge to improve our productivity" in English, wherein "productivity" is the current speech input. Through the improved speech recognition service according to the embodiments of the present disclosure, the speech recognition result area 418 may display a plurality of previous utterance texts "It's a challenge to improve our" that the user Clair has spoken, an identified current utterance text "productivity", and a prompt "tools in processing". The prompt comprises a predicted subsequent utterance text sequence which includes 3 predicted subsequent utterance texts "tools", "in" and "processing". In other words, even though the user Clair just said the word "productivity", the speech recognition result area 418 has already displayed a prediction of an utterance that the user Clair may speak next.

As shown in FIG. 4, the prompt is provided in a different presentation approach from the previous utterance texts and the current utterance text. For example, the texts "tools in processing" in the prompt is presented in an approach of different font and underlined.

It should be understood that all the elements and their layouts in FIG. 3 and FIG. 4 are exemplary, which are only used for visually displaying exemplary scenarios according to the embodiments of the present disclosure. Moreover, the embodiments of the present disclosure are not limited to the illustrated exemplary presentation approaches for providing prompts, but may adopt various other presentation approaches. Moreover, although speech utterances and utterance texts in the language of English are illustrated, the embodiments of the present disclosure are not limited to any specific language.

Figure 5:
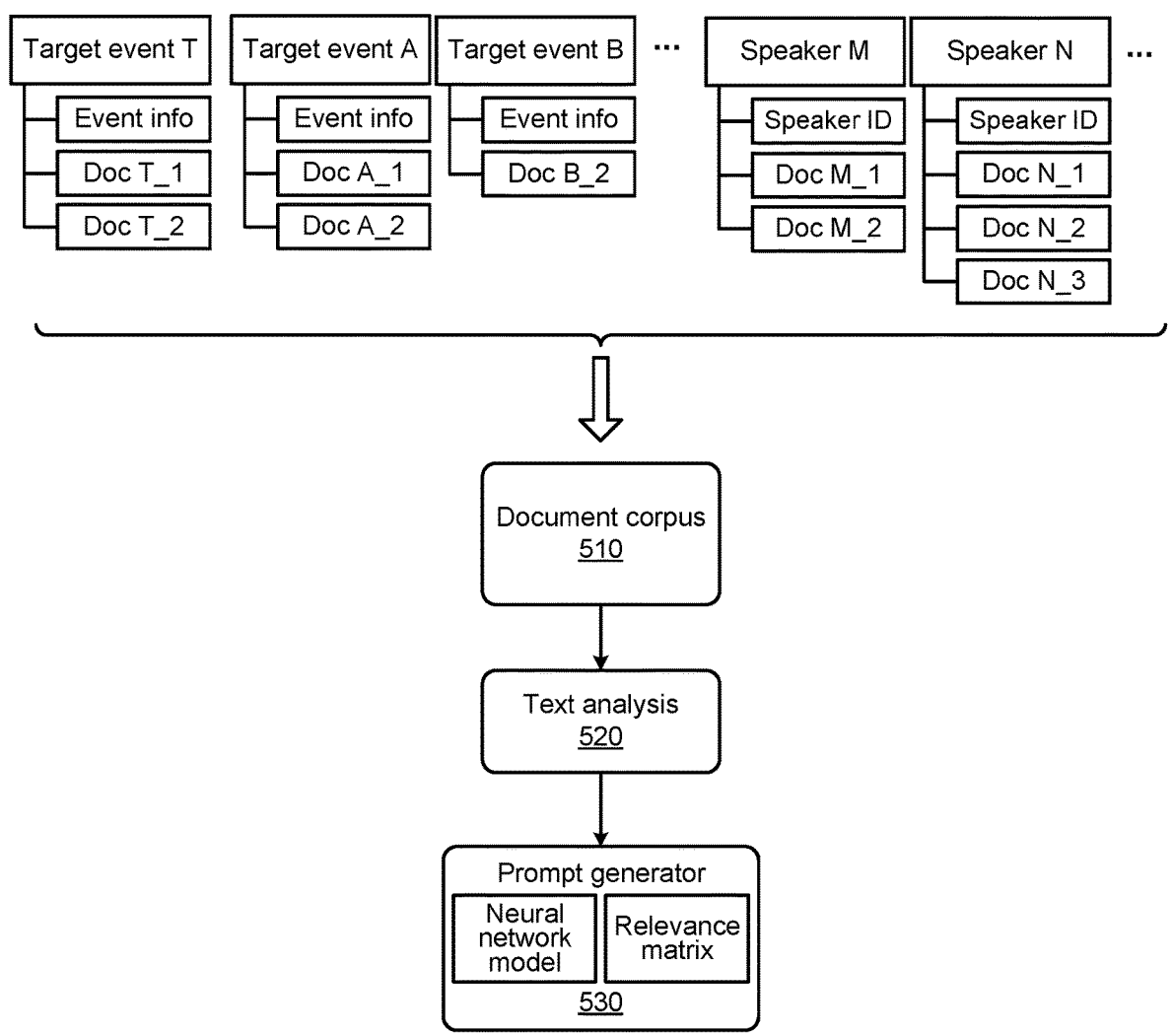
FIG. 5 illustrates an exemplary process of establishing a prompt generator according to an embodiment.

FIG. 5 illustrates an exemplary process 500 of establishing a prompt generator according to an embodiment.

According to the embodiments of the present disclosure, in order to accurately predict subsequent utterance texts and generate prompts, a corpus may be constructed at least with documents associated with events and/or speakers, and the corpus may be further used for establishing a prompt generator.

In an implementation, at least one document associated with a target event T may be obtained, e.g., document T_1, document T_2, etc. The target event may refer to an event for which speech recognition will be implemented in a target application, e.g., a conference related to a certain discussion topic held through a remote conference system, a lecture about a certain topic made through a slideshow application, etc. Taking a lecture S related to a topic L made through a slideshow application as an example, the lecture S may have one or more associated documents, e.g., a slide file that a speaker will display when giving the lecture, and these documents comprise discussion content related to the topic L. These documents may provide information that facilitates to predict subsequent utterance texts. For example, assuming that a plurality of sentences in these documents comprise the term "Hidden Markov Model", which indicates that the three words "Hidden", "Markov" and "Model" have high relevance at least in the lecture S, this information will facilitate to predict a subsequent utterance text sequence "Markov Model" with a higher probability in the case that a current utterance text is, e.g., "Hidden". Optionally, event information associated with the target event T may also be obtained. The event information may comprise, e.g., an event ID of the target event T, time information of the target event T, an agenda of the target event T, participant IDs of participants of the target event T, speaker IDs of speakers associated with the documents involved in the target event T, etc. The participants of the target event T may refer to those persons participating in the target event, which comprise speakers who speak in the target event and persons who do not speak. The time information of the target event T may comprise, e.g., a time point when the target event T starts, a time period of the target event T, etc. The agenda of the target event T may comprise, e.g., topics, speakers, etc. arranged in a chronological order. The establishment of the prompt generator may be further based on the obtained event information. Through establishing a prompt generator with the documents and optional event information associated with the target event T before the occurrence of the target event T, the prompt generator may more accurately generate prompts adaptive to the target event during the occurrence of the target event T, thereby achieving prompt generator customization for the target event T. The documents and event information associated with the target event T may be provided by participants, speakers, or others of the target event T. The obtained documents and event information associated with the target event T may be stored in a document corpus 510.

In an implementation, a plurality of documents respectively associated with a plurality of different events may be collected for jointly establishing a prompt generator. For example, document A_1 and document A_2 associated with an event A, document B_1 associated with an event B, etc. may be obtained. Moreover, optionally, event information respectively associated with these events may also be obtained. Through establishing a prompt generator with documents and optional event information associated with a plurality of events, universality of the prompt generator may be enhanced. The obtained documents and event information associated with the plurality of events may be stored in the document corpus 510.

In an implementation, a plurality of documents respectively associated with a plurality of different speakers may be collected for establishing a prompt generator. For example, document M_1 and document M_2 associated with a speaker M, documents N_1, N_2 and N_3 associated with a speaker N, etc. may be obtained. Moreover, optionally, speaker IDs respectively associated with these speakers may also be obtained. Although a plurality of documents of each speaker may be associated with different events, these documents facilitate to jointly construct a corpus specific to the speaker, thus achieving prompt generator customization for the speaker. Documents and a speaker ID associated with a specific speaker may be provided by the speaker or others. The obtained documents and speaker IDs associated with the plurality of speakers may be stored in the document corpus 510.

Through the above process, a plurality of documents will be stored in the document corpus 510, and each document may have corresponding label information, e.g., event information, speaker ID, etc. At 520, text analysis may be performed on the documents in the document corpus 510 to obtain data that is used for establishing a prompt generator. For example, a word sequence or a word set may be extracted from each document through word segmentation, and each word will have the same label information as the document. Moreover, depending on the specific implementation of the prompt generator, the text analysis at 520 may also comprise possible further processing.

According to the embodiments of the present disclosure, a prompt generator 530 may be based on a neural network model, e.g., a recurrent neural network (RNN) model for text prediction. The neural network model may be trained with previously prepared word sequences, for predicting a next word based on one or more input words. For example, the neural network model may be an n-gram model, where n≥1, and thus may predict a next word based on n words. In an implementation, the neural network model may be trained with a plurality of word sequences extracted from a plurality of documents associated with a plurality of events through the text analysis at 520, to obtain a general prompt generator. In an implementation, the neural network model may be trained with word sequences extracted from documents associated with a target event through the text analysis at 520, to obtain a prompt generator customized for the target event. In an implementation, the neural network model may be trained with word sequences extracted from documents associated with a specific speaker through the text analysis at 520k, to obtain a prompt generator customized for the specific speaker. It should be understood that the above plurality of implementations may also be combined in any approach. For example, after a general prompt generator is obtained, the general prompt generator may be retrained and optimized with word sequences extracted from documents associated with a target event, to obtain a prompt generator customized for the target event. For example, after a general prompt generator is obtained, the general prompt generator may be retrained and optimized with word sequences extracted from documents associated with a specific speaker, to obtain a prompt generator customized for the specific speaker. For example, the neural network model may be trained with both word sequences extracted from documents associated with a target event and word sequences extracted from documents associated with a specific speaker, to obtain a prompt generator customized for both the target event and the specific speaker.

Moreover, optionally, when training the prompt generator 530 which is based on a neural network model, label information of words may be further considered. For example, when the neural network model predicts a next word based on one or more input words, candidate words that have the same, e.g., event ID, speaker ID, etc. as the input words may be given higher weights, so that these candidate words have higher probability to be predicted as the next word. This may further improve prediction accuracy, because those words with the same event ID and/or speaker ID generally have higher relevance.

Moreover, optionally, in each prediction step, the prompt generator 530 which is based on a neural network model may also output a plurality of highest ranked next word candidates.

Moreover, the prompt generator 530 which is based on a neural network model may be run iteratively, so as to predict a subsequent word sequence in response to an input word. For example, after predicting a first subsequent word based at least on an input word, the prompt generator 530 which is based on a neural network model may further predict a second subsequent word based at least on the first subsequent word, and so on, thus finally obtaining a subsequent word sequence including a plurality of subsequent words. Further, assuming that the prompt generator 530 which is based on a neural network model predicts a plurality of highest ranked first subsequent word candidates based at least on an input word, the prompt generator 530 may further iteratively predict subsequent words for each first subsequent word candidate respectively, thus finally obtaining a plurality of predicted subsequent word sequences. In the case of outputting a plurality of predicted subsequent word sequences in response to the same input word, a total confidence of each sequence may be calculated respectively, and these sequences may be ranked based on total confidences. Optionally, at least one subsequent word sequence highest ranked by confidence may be output.

According to the embodiments of the present disclosure, the prompt generator 530 may be based on a relevance matrix. The relevance matrix may comprise a plurality of text items and relevance values among the plurality of text items, wherein each text item may be one or more words. For example, the relevance matrix may be an n-element matrix, where n≥1, so that each text item may comprise n words. If n>1, each text item comprises n consecutive words in a document. In this case, the text analysis at 520 may further comprise determining relevance values among text items in a plurality of extracted word sequences. A relevance value between two text items may be determined through any known approach, e.g., at least one of the following factors may be considered: semantic relevance between the two text items, whether the two text items are adjacent, whether the two text items belong to the same document, whether the two text items have the same event ID and/or speaker ID, etc. An exemplary relevance matrix is shown in Table 1 below.

TABLE 1

| Text Item | topic | leverage | Hidden | Markov | Model | to | evolve | scenario ... |
|---|---|---|---|---|---|---|---|---|
| topic | — | 1 | 2 | 3 | 4 | 5 | 6 | 7 |
| leverage | −1 | — | 1 | 2 | 3 | 4 | 5 | 6 |
| Hidden | −2 | −1 | — | 1 | 2 | 3 | 4 | 5 |
| Markov | −3 | −2 | −1 | — | 1 | 2 | 3 | 4 |
| Model | −4 | −3 | −2 | −1 | — | 1 | 2 | 3 |
| to | −5 | −4 | −3 | −2 | −1 | — | 1 | 2 |
| evolve | −6 | −5 | −4 | −3 | −2 | −1 | — | 1 |
| scenario | −7 | −6 | −5 | −4 | −3 | −2 | −1 | — |
| ... | | | | | | | | |

The relevance matrix in Table 1 is a one-element matrix, which shows relevance values among the exemplary text items "topic", "leverage", "Hidden", "Markov", "Model", "to", "scenario", etc. Numerical values in Table 1 indicate relevance values of text items in the columns with respect to text items in the rows. It is assumed that these text items are extracted from a sentence of "The next topic is how we leverage Hidden Markov Model to evolve scenario . . . " in a document. Through the text analysis at 520, relevance values among these text items may be obtained, e.g., "leverage" has a relevance value of "1" relative to "topic", "Model" has a relevance value of "2" relative to "Hidden", "Markov" has a relevance value of "4" relative to "Model", etc. A smaller absolute value of a relevance value between two text items indicates higher relevance between the two text items. A positive relevance value indicates relevance in a linguistic order, and a negative relevance value indicates relevance in a reverse linguistic order. For example, for the text items "Hidden", "Markov" and "Model" in the above exemplary sentence, the linguistic order is "Hidden→Markov→Model", thus "Markov" has a positive relevance value relative to "Hidden" and "Model" has a positive relevance value relative to "Markov", while the reverse language order is "Hidder←Markow←Model", thus "Hidden" has a negative relevance value relative to "Markov" and "Markov" has a relative relevance value relative to "Model". Although an absolute value of the relevance value "−1" of "Hidden" relative to "Markov" and an absolute value of the relevance value "1" of "Model" relative to "Markov" are the same, i.e., the degrees of relevance are the same, but in terms of linguistic order, "Model" has higher relevance relative to "Markov". It should be understood that all the elements in Table 1 are exemplary, and in practical applications, the relevance matrix may comprise more content or have different formats. For example, text items in a relevance matrix may come from different sentences or documents, relevance values may adopt different denoting approaches, etc. For example, each text item in a relevance matrix may comprise more than one word.

For an input word, the prompt generator 530 which is based on a relevance matrix may select or predict a next text item or word according to relevance values between text items in the matrix and the input word. For example, assuming that the input word is "Markov", according to the relevance matrix in Table 1, the text item "Model" having the highest relevance with the text item "Markov" may be selected as a predicted next text item or word, wherein the text item "Model" has a positive relevance value of "1" relative to the text item "Markov", and an absolute value of the positive relevance value is the smallest as compared to other text items. Optionally, for each input word, the prompt generator 530 which is based on a relevance matrix may output a plurality of highest-ranked next text item or word candidates. For example, assuming that the input word is "leverage", according to the relevance matrix in Table 1, the two text items "Hidden" and "Model" having the highest relevance with the text item "leverage" may be selected as two predicted next text item or word candidates, wherein the text item "Hidden" having a positive relevance value of "1" is ranked higher than the text item "Model" having a positive relevance value of "2" and thus is more likely to be the actual next word.

Although label information of text items or words, e.g., event ID, speaker ID, etc., is taken into account when determining relevance values among text items at 520, optionally, corresponding label information may also be added to each text item in a relevance matrix. Therefore, when predicting a next word based on an input word with the relevance matrix, higher weights may be given to text items that have the same, e.g., event ID, speaker ID, etc. as the input word, so that there would be higher probability to predict these text items as the next word. This may further improve prediction accuracy.

Moreover, the prompt generator 530 which is based on a relevance matrix may be run iteratively, so as to predict or select a subsequent text item sequence or a subsequent word sequence in response to an input word. For example, after predicting a first subsequent text item based at least on an input word, the prompt generator 530 which is based on a relevance matrix may further predict a second subsequent text item based at least on the first subsequent text item, and so on, thus finally obtaining a subsequent text item sequence including a plurality of subsequent text items. Further, assuming that the prompt generator 530 which is based on a relevance matrix predicts a plurality of highest ranked first subsequent text item candidates based at least on an input word, the prompt generator 530 may further iteratively predict subsequent text items for each first subsequent text item candidate respectively, thus finally obtaining a plurality of predicted subsequent text item sequences. In the case of outputting a plurality of predicted subsequent text item sequences in response to the same input word, a total relevance of each sequence may be calculated respectively, and these sequences may be ranked based on total relevance. Optionally, at least one text item sequence highest ranked by relevance may be output.

It should be understood that the establishing process of the prompt generator 530 discussed above in conjunction with the process 500 is only exemplary, and the process 500 may be modified in any approaches according to specific application requirements and designs. For example, the document corpus 510 may comprise one or more of: documents associated with the target event T; a plurality of documents associated with a plurality of events; and documents associated with a specific speaker. For example, different prompt generators may be established through different corpora in the document corpus 510 respectively, and these prompt generators may be jointly used for predicting a subsequent utterance text. As an example, a general prompt generator and a customized prompt generator for the target event T may be previously established, and when making predictions during the occurrence of the target event T, the best prediction result among prediction results generated by the two prompt generators may be selected, through various approaches, as the final predicted subsequent utterance text. Moreover, it should be understood that the prompt generator 530 established through the process 500 may be applied to predict a subsequent utterance text or a subsequent utterance text sequence based at least on the current utterance text, wherein an input word provided to the prompt generator 530 may be the current utterance text, and a next word/text item or a subsequent word/text item sequence predicted by the prompt generator 530 may be the subsequent utterance text or the subsequent utterance text sequence.

Figure 6:
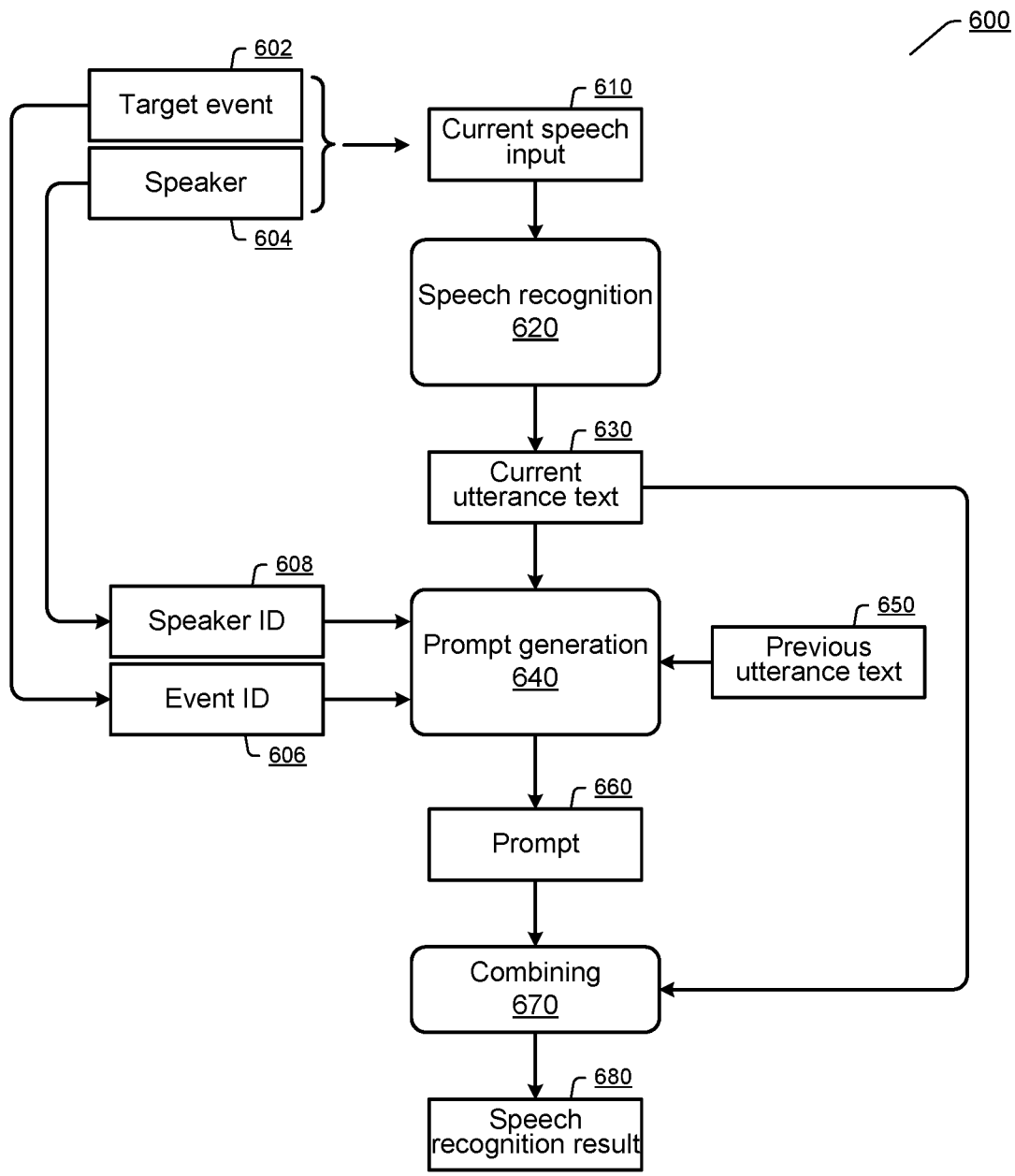
FIG. 6 illustrates an exemplary process of providing prompts in speech recognition results in real time according to an embodiment.

FIG. 6 illustrates an exemplary process 600 of providing prompts in speech recognition results in real time according to an embodiment.

It is assumed that a target event 602 is occurring in a target application, and a speaker 604 is speaking an utterance by speech and thus an audio stream for the target event 602 is produced. For a current speech input 610 in the audio stream, e.g., a word currently being spoken by the speaker 604, speech recognition may be performed on the speech input 610 at 620 to generate a current utterance text 630 corresponding to the current speech input 610. The speech recognition at 620 may be performed through, e.g., the speech recognizer 122 in FIG. 1 and FIG. 2.

At 640, a prompt 660 including at least one predicted subsequent utterance text sequence may be generated based at least on the current utterance text 630. The prompt generator 530 previously established through the process 500 in FIG. 5 may be adopted for performing the prompt generation at 640. For example, through the prompt generator, the at least one predicted subsequent utterance text sequence may be predicted based at least on the current utterance text 630.

Optionally, in an implementation, the prompt generation at 640 may be further based on at least one previous utterance text 650 identified before the current utterance text 630, e.g., one or more words identified for one or more speech inputs before the current speech input 610 in the audio stream. Assuming that the prompt generator is an n-element (n>1) prompt generator, the at least one previous utterance text 650 may comprise, e.g., n−1 previous utterance texts.

Optionally, in an implementation, an event ID 606 of the target event 602 and/or a speaker ID 608 of the speaker 604 may be obtained, and the event ID 606 and/or the speaker ID 608 may be used for the prompt generation at 640. The event ID 606 and/or the speaker ID 608 may be provided by participants, speakers, or others associated with the target event 602. Optionally, the event ID 606 and/or the speaker ID 608 may be determined based on event information of the target event 602 previously obtained. For example, the occurrence of the target event 602 may be determined based on a comparison between the current time and time information of the target event 602, and a corresponding event ID may be extracted. For example, a speaker ID corresponding to the current speaker 604 may be determined based on an agenda of the target event 602.

Depending on the specific implementation of the prompt generator, the event ID 606 and/or the speaker ID 608 may be used in different approaches at 640. For example, in one case, the event ID 606 and/or speaker ID 608 may be used for selecting a previously-established customized prompt generator corresponding to the event ID 606 and/or the speaker ID 608 to perform the prompt generation at 640. For example, in one case, the event ID 606 and/or the speaker ID 608 may be used for affecting the prediction of a subsequent utterance text by a general prompt generator, so that candidate words having the same event ID 606 and/or speaker ID 608 may be determined as a subsequent utterance text with higher probability. For example, in one case, if a plurality of prompt generators are adopted for jointly predicting a subsequent utterance text, one or more of these prompt generators may predict a subsequent utterance text based on the event ID 606 and/or the speaker ID 608.

It should be understood that the predicted subsequent utterance text sequence in the prompt 660 may comprise one or more subsequent utterance texts. For example, after a first subsequent utterance text adjacent to the current utterance text 630 is predicted based at least on the current utterance text 630, a second subsequent utterance text may be further predicted based at least on the first subsequent utterance text, etc. These predicted subsequent utterance texts may be included in the prompt 660 in the form of sequence.

At 670, the current utterance text 630 and the prompt 660 may be combined to form a speech recognition result 680. Optionally, in the speech recognition result 680, different presentation approaches may be adopted for the current utterance text 630 and the prompt 660, so as to visually distinguish the current utterance text 630 and the prompt 660.

It should be understood that the above process 600 is only exemplary, and the process 600 may be varied and modified in any approach according to specific application requirements and designs. For example, as new speech inputs continuously appear in the audio stream, the process 600 may be performed iteratively for the new speech inputs, so as to provide speech recognition results including prompts in real time. Moreover, the process 600 may further comprise determining relevant information of the current utterance text and/or prompt, and including the relevant information into a speech recognition result. The relevant information may refer to various types of information associated with the current utterance text and/or the predicted subsequent utterance text sequence in the prompt. For example, assuming that the current utterance text is "Hidden" and the predicted subsequent utterance text sequence in the prompt is "Markov Model", text description, link, etc. associated with "Hidden Markov Model" may be determined as relevant information. The embodiments of the present disclosure may enhance information richness of a speech recognition result by including relevant information into the speech recognition result, but are not limited to any specific approach of determining or obtaining the relevant information. Moreover, it should be understood that the speech recognition result 680 may also comprise one or more identified previous utterance texts.

Figure 7:
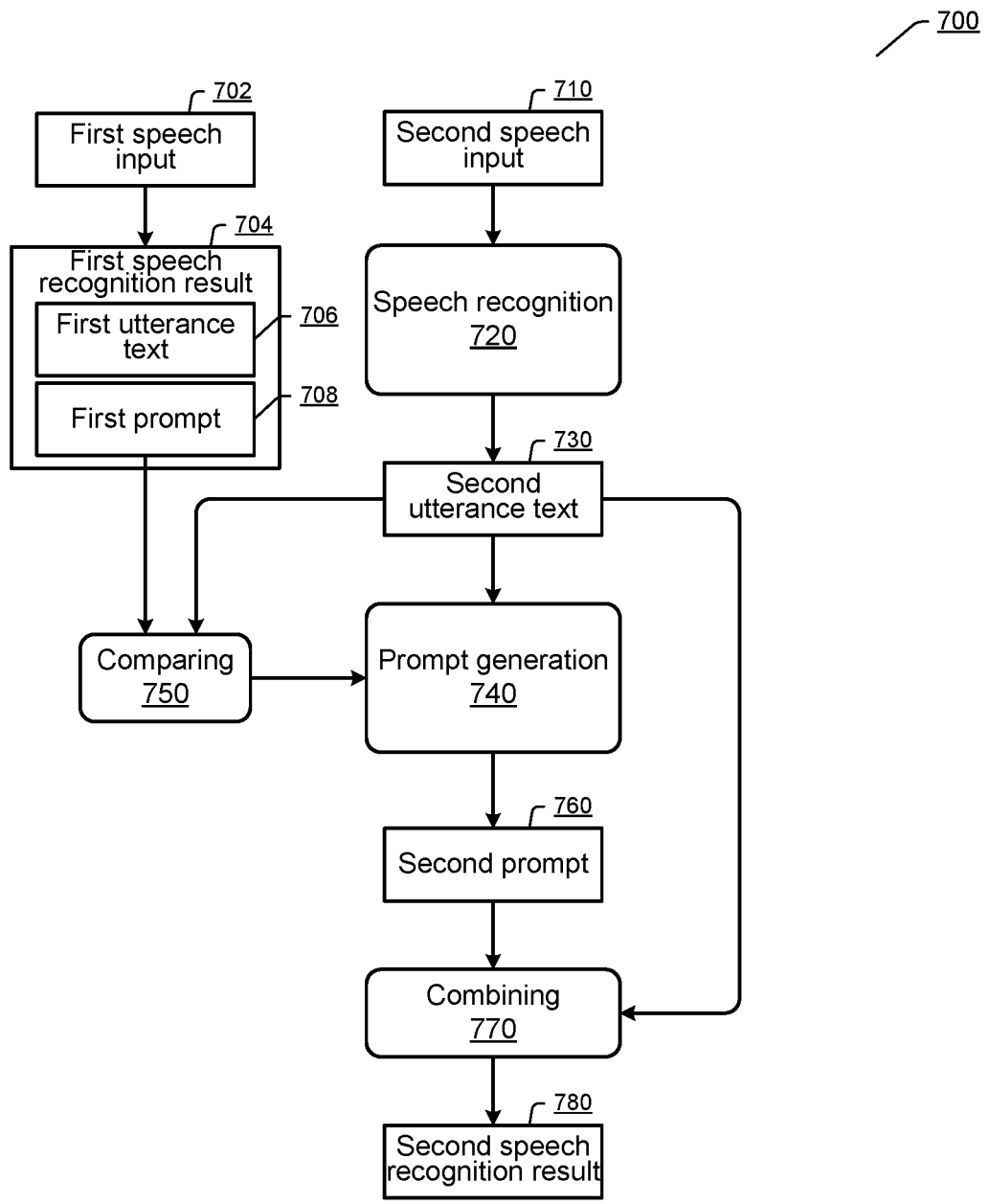
FIG. 7 illustrates an exemplary process of providing prompts in speech recognition results in real time according to an embodiment.

FIG. 7 illustrates an exemplary process 700 of providing prompts in speech recognition results in real time according to an embodiment. The process 700 may be regarded as an exemplary continuation of the process 600 in FIG. 6.

It is assumed that a first speech recognition result 704 corresponding to a first speech input 702 has been generated through the process 600, wherein the first speech input 702 and the first speech recognition result 704 may correspond to the current speech input 610 and the speech recognition result 680 in FIG. 6 respectively. The first speech recognition result 704 may comprise a first utterance text 706 and a first prompt 708, which correspond to the current utterance text 630 and the prompt 660 in FIG. 6, respectively.

It is assumed that, after the first speech input 702 is obtained, a subsequent second speech input 710 is further obtained in the audio stream, and the second speech input 710 becomes the current speech input. At 720, speech recognition may be performed on the second speech input 710 to generate a second utterance text 730 corresponding to the second speech input 710, and the second utterance text 730 becomes the current utterance text. The speech recognition at 720 may be similar with the speech recognition at 620 in FIG. 6.

At 740, a second prompt 760 may be generated based at least on the second utterance text 730. In an implementation, the process 700 may comprise comparing the second utterance text 730 with the predicted subsequent utterance text sequence in the first prompt 708 at 750, and applying a result of the comparison for the prompt generation at 740. Through the comparison at 750, it may be identified whether the speech utterance of the speaker includes errors or omissions.

As an example, the speaker wants to speak "The next topic is how we leverage Hidden Markov Model to evolve . . . " by speech. It is assumed that the first speech input 702 corresponds to "Hidden", the first utterance text 706 is identified as "Hidden", and the first prompt 708 is "Markov Model to".

If the second speech input 710 by the speaker corresponds to "Macao", which was misspoken, and the second utterance text 730 is identified as "Macao", then through comparing the second utterance text 730 with the first prompt 708, it may be found out that the speaker may misspeak "Markov" as "Macao" which has a similar pronunciation. In this case, the comparison result may be provided to the prompt generation at 740. Correspondingly, at 740, a subsequent utterance text sequence may be predicted based at least on the revised second utterance text "Markov", or optionally, respective subsequent utterance text sequences may be predicted based on the identified second utterance text "Macao" and the corrected second utterance text "Markov" respectively.

If the second speech input 710 by the speaker corresponds to "Model", and the second utterance text 730 is identified as "Model", then through comparing the second utterance text 730 with the first prompt 708, it may be found out that the speaker may have omitted the word "Markov" between the word "Hidden" and the word "Model". In this case, the comparison result may be provided to the prompt generation at 740. Accordingly, at 740, a subsequent utterance text sequence may be predicted by taking the omitted word "Markov" as a previous utterance text of the second utterance text 730.

Except for the above processing for the cases of error or omission, the prompt generation process at 740 may be similar with the prompt generation process at 640 in FIG. 6. It should be understood that, according to predetermined rules, correction to a misspoken word or addition of an omitted word may be included in the second prompt 760 in any approaches.

At 770, the second utterance text 730 and the second prompt 760 may be combined into a second speech recognition result 780.

It should be understood that the above process 700 is only exemplary, and the process 700 may be varied and modified in any approach according to specific application requirements and designs.

Figure 8:
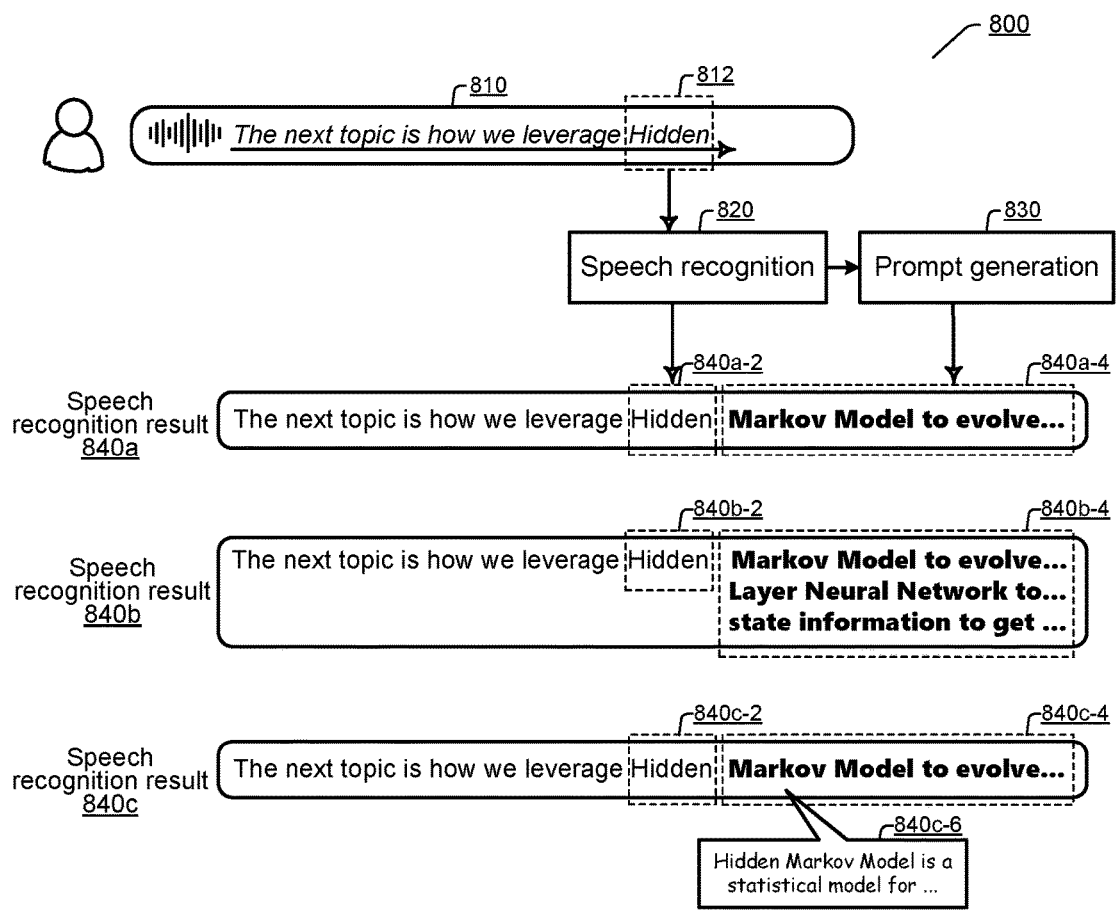
FIG. 8 to FIG. 11 illustrate examples of providing prompts in speech recognition results in real time according to embodiments.

FIG. 8 illustrates an example 800 of providing prompts in speech recognition results in real time according to an embodiment. The example 800 is intended to show speech recognition results that are provided in different approaches.

It is assumed that an audio stream 810 from a speaker comprises a speech corresponding to "The next topic is how we leverage Hidden", wherein "Hidden" is a current speech input 812. At 820, a current utterance text "Hidden" corresponding to the current speech input 812 may be identified. Moreover, at 830, a prompt may be generated based at least on the current utterance text. The prompt generation at 830 may be similar with the prompt generation at 640 in FIG. 6. The current utterance text and the prompt may be combined into a speech recognition result. FIG. 8 illustrates three exemplary speech recognition results provided in different approaches.

In an exemplary speech recognition result 840*a*, a prompt comprises only one predicted subsequent utterance text sequence. As shown, the speech recognition result 840*a* may comprise a current utterance text 840*a*-2 "Hidden" and a prompt 840*a*-4. The prompt 840*a*-4 only comprises one predicted subsequent utterance text sequence "Markov Model to evolve", wherein the predicted subsequent utterance text sequence comprises a plurality of subsequent utterance texts "Markov", "Model", "to", "evolve" etc., that are predicted successively. The word "Markov" is predicted based at least on the current utterance text "Hidden", e.g., a prompt generator may predict "Markov" based on "Hidden", or the prompt generator may predict "Markov" based on "leverage" and "Hidden", etc. Similarly, the word "Model" is predicted based at least on the word "Markov", the word "to" is predicted based at least on the word "Model", and the word "evolve" is predicted based at least on the word "to". Moreover, the speech recognition result 840*a* also comprises a plurality of previous utterance texts identified before the current utterance text 840*a*-2, e.g., "leverage", "we", "how", etc. The current utterance text 840*a*-2 and the prompt 840*a*-4 are provided in different presentation approaches.

In an exemplary speech recognition result 840*b*, a prompt comprises a plurality of predicted subsequent utterance text sequences. As shown, the speech recognition result 840*b* may comprise a current utterance text 840*b*-2 "Hidden" and a prompt 840*b*-4. The prompt 840*b*-4 comprises three predicted subsequent utterance text sequences, e.g., "Markov Model to evolve", "Layer Neural Network to", "state information to get", etc., wherein each predicted subsequent utterance text sequence comprises a plurality of subsequent utterance texts that are predicted successively. The plurality of predicted subsequent utterance text sequences may be ranked according to total confidences or total relevance. For example, "Markov Model to evolve" is arranged at the first position, which indicates that the possibility of speaking this predicted subsequent utterance text sequence by the speaker next is the highest. Moreover, the speech recognition result 840*b* further comprises a plurality of previous utterance texts identified before the current utterance text 840*b*-2. The current utterance text 840*b*-2 and the prompt 840*b*-4 are provided in different presentation approaches.

In an exemplary speech recognition result 840*c*, a prompt only comprises one predicted subsequent utterance text sequence, but the speech recognition result 840*c* further comprises relevant information of a current utterance text and/or the prompt. As shown, the speech recognition result 840*c* may comprise a current utterance text 840*c*-2 "Hidden", a prompt 840*c*-4, and relevant information 840*c*-6. The prompt 840*c*-4 comprises a predicted subsequent utterance text sequence "Markov Model to evolve". The relevant information 840*c*-6 is a description of the "Hidden Markov Model" included in the current utterance text 840*c*-2 and the prompt 840c-4. Moreover, the speech recognition result 840c further comprises a plurality of previous utterance texts identified before the current utterance text 840c-2. The current utterance text 840c-2, the prompt 840c-4, and the relevant information 840c-6 are provided in different presentation approaches.

Figure 9:
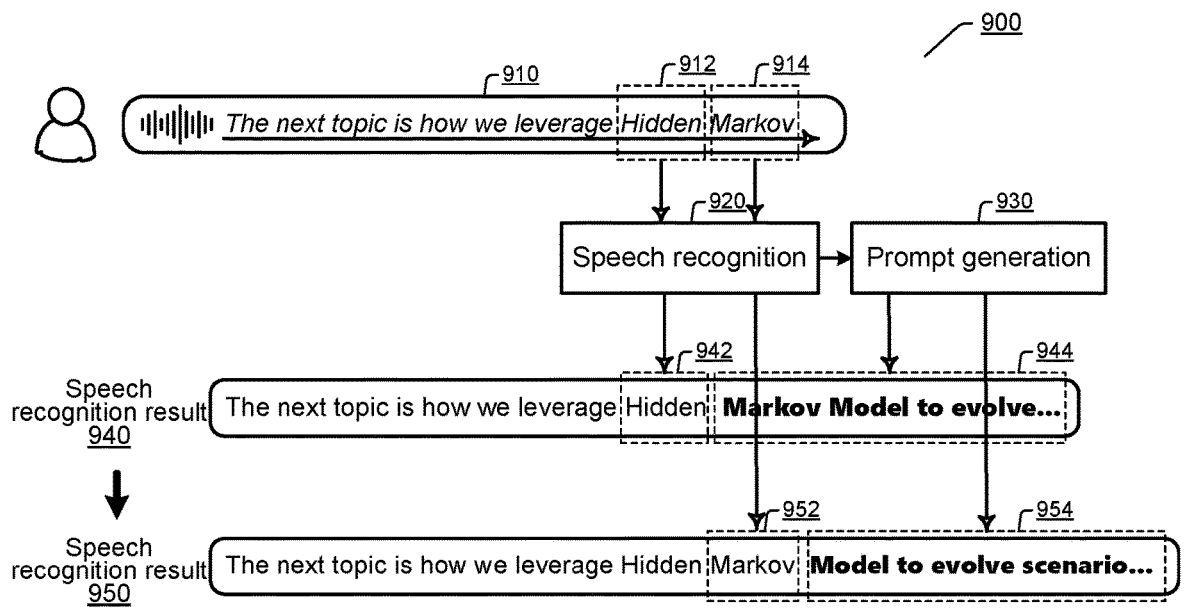

FIG. 9 illustrates an example 900 of providing prompts in speech recognition results in real time according to an embodiment. The example 900 is intended to illustrate an exemplary process of providing prompts in real time as an audio stream proceeds.

It is assumed that a speech currently appearing in an audio stream 910 from a speaker corresponds to "Hidden", i.e., the speech corresponding to "Hidden" is a current speech input 912. At 920, a current utterance text "Hidden" corresponding to the current speech input 912 may be identified. Moreover, at 930, a prompt may be generated based at least on the current utterance text, wherein the prompt comprises a predicted subsequent utterance text sequence "Markov Model to evolve". A speech recognition result 940 corresponding to the current speech input 912 may be provided. The speech recognition result 940 may comprise a current utterance text 942 and a prompt 944.

It is assumed that, in the audio stream 910 from the speaker, a speech corresponding to "Markov" appears after the speech corresponding to "Hidden", i.e., the speech corresponding to "Markov" becomes a current speech input 914. At 920, a current utterance text "Markov" corresponding to the current speech input 914 may be identified. Moreover, at 930, a prompt may be generated based at least on the current utterance text, wherein the prompt comprises a predicted subsequent utterance text sequence "Model to evolve scenario". A speech recognition result 950 corresponding to the current speech input 914 may be provided. The speech recognition result 950 may comprise the current utterance text 952 and the prompt 954.

Referring to example 900, as the audio stream proceeds, corresponding prompts may be provided in real time in speech recognition results for subsequent speech inputs.

Figure 10:
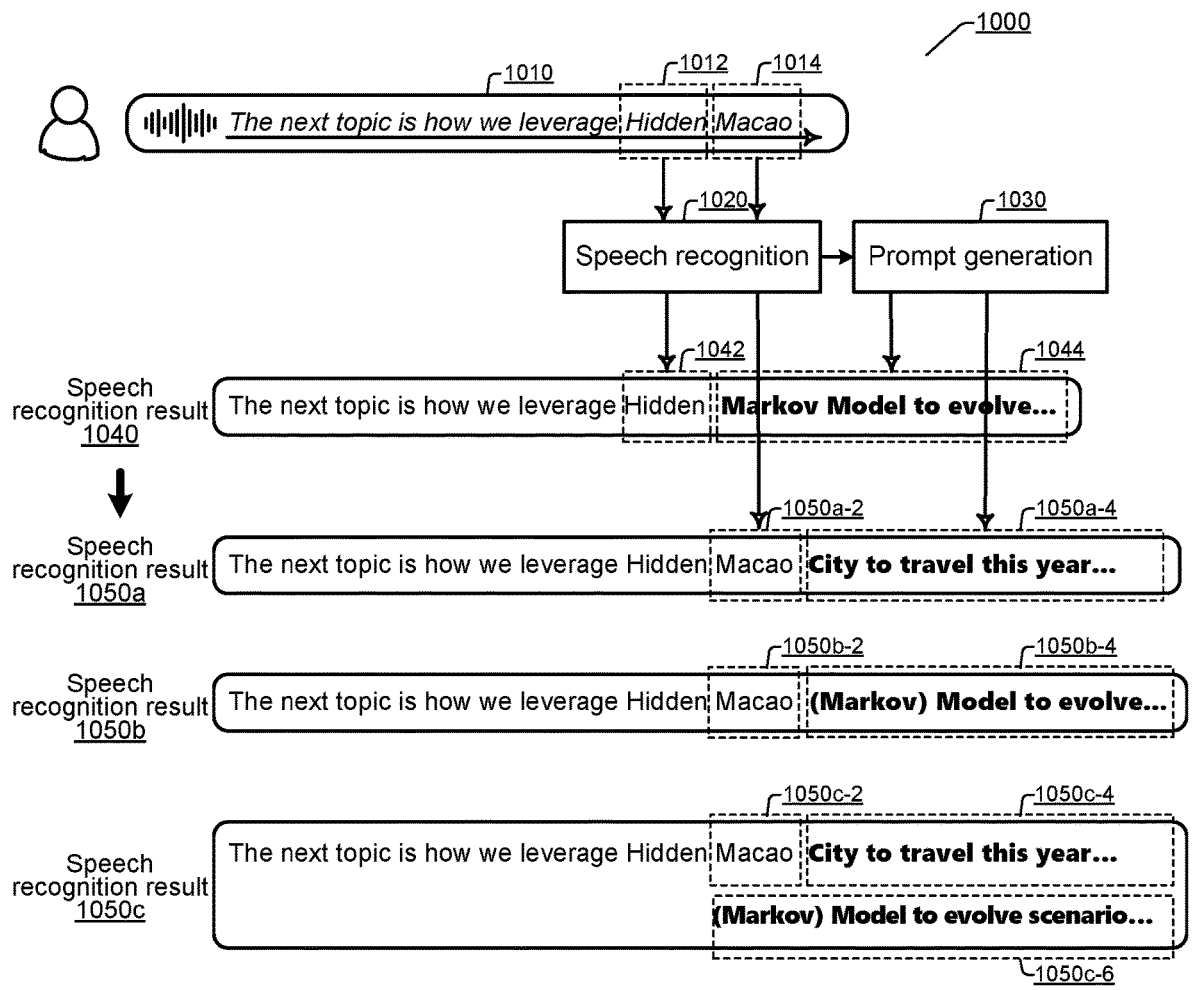

FIG. 10 illustrates an example 1000 of providing prompts in speech recognition results in real time according to an embodiment. The example 1000 is intended to illustrate prompts that are provided in different approaches in the case that a speaker misspeaks.

It is assumed that a speech currently appearing in an audio stream 1010 from a speaker corresponds to "Hidden", i.e., the speech corresponding to "Hidden" is a current speech input 1012. At 1020, a current utterance text "Hidden" corresponding to the current speech input 1012 may be identified. Moreover, at 1030, a prompt may be generated based at least on the current utterance text, wherein the prompt comprises a predicted subsequent utterance text sequence "Markov Model to evolve". A speech recognition result 1040 corresponding to the current speech input 1012 may be provided. The speech recognition result 1040 may comprise the current utterance text 1042 and the prompt 1044.

It is assumed that, in the audio stream 1010 from the speaker, a speech corresponding to "Macao" appears after the speech corresponding to "Hidden", i.e., the speech corresponding to "Macao" becomes a current speech input 1014. In fact, the speaker misspoken the word "Markov", which was intended to speak, as "Macao". At 1020, a current utterance text "Macao" corresponding to the current speech input 1014 may be identified.

Through comparing the current utterance text "Macao" with the predicted subsequent utterance text sequence "Markov Model to evolve" included in the prompt 1044 in the speech recognition result 1040, it may be determined that the speaker may have misspoken the word "Markov" predicted in the prompt 1044 as the word "Macao". A prompt may be provided in a speech recognition result corresponding to the current speech input 1014 according to different strategies.

According to a strategy, a subsequent utterance text sequence may be predicted further based on the misspoken word "Macao" to form a prompt. For example, at 1030, a prompt may be generated based at least on the current utterance text "Macao", wherein the prompt includes a predicted subsequent utterance text sequence "City to travel this year". A speech recognition result 1050a corresponding to the current speech input 1014 may be provided, which comprises the current utterance text 1050a-2 and the prompt 1050a-4. The prompt 1050a-4 comprises the predicted subsequent utterance text sequence "City to travel this year".

According to another strategy, a subsequent utterance text sequence may be predicted based on the word "Markov", which is determined to be correct through the above comparison, to form a prompt. Accordingly, the prompt generation process at 740 in FIG. 7 may be adopted. For example, at 1030, a prompt may be generated based at least on the word "Markov", wherein the prompt comprises a predicted subsequent utterance text sequence "Model to evolve". A speech recognition result 1050b corresponding to the current speech input 1014 may be provided, which comprises the current utterance text 1050b-2 and the prompt 1050b-4. The prompt 1050b-4 comprises an indication "(Markov)" of the correct word and the predicted subsequent utterance text sequence "Model to evolve".

According to another strategy, the above two strategies may be combined. For example, in an aspect, a subsequent utterance text sequence is predicted based on the misspoken word "Macao" to form a first prompt part, and in another aspect, another subsequent utterance text sequence is predicted based on the correct word "Markov" to form a second prompt part. Accordingly, a speech recognition result 1050c corresponding to the current speech input 1014 may be provided, which comprises a current utterance text 1050c-2, a first prompt part 1050c-4, and a second prompt part 1050c-6. The first prompt part 1050c-4 comprises the predicted subsequent utterance text sequence "City to travel this year", and the second prompt part 1050c-6 comprises an indication "(Markov)" of the correct word and the predicted subsequent utterance text sequence "Model to evolve".

Figure 11:
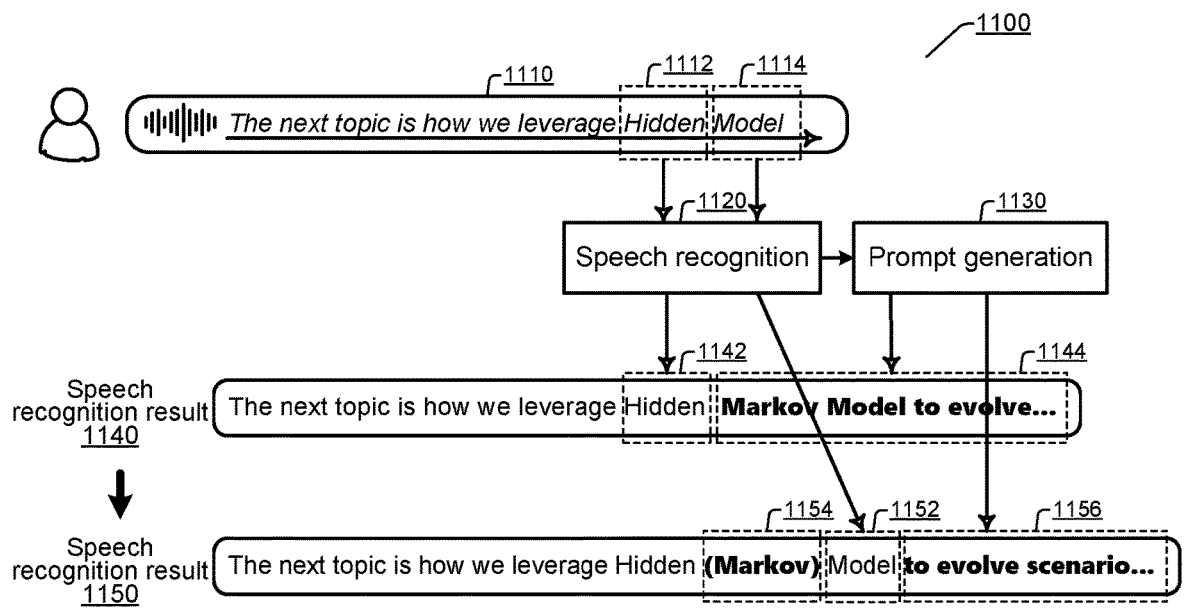

FIG. 11 illustrates an example 1100 of providing prompts in speech recognition results in real time according to an embodiment. The example 1100 is intended to illustrate an approach of providing prompts in the case that a word is omitted when a speaker is speaking.

It is assumed that a speech currently appearing in an audio stream 1110 from a speaker corresponds to "Hidden", i.e., the speech corresponding to "Hidden" is a current speech input 1112. At 1120, a current utterance text "Hidden" corresponding to the current speech input 1112 may be identified. Moreover, at 1130, a prompt may be generated based at least on the current utterance text, wherein the prompt comprises a predicted subsequent utterance text sequence "Markov Model to evolve". A speech recognition result 1140 corresponding to the current speech input 1112 may be provided. The speech recognition result 1140 may comprise a current utterance text 1142 and a prompt 1144.

It is assumed that, in the audio stream 1110 from the speaker, a speech corresponding to "Model" appears after the speech corresponding to "Hidden", i.e., the speech corresponding to "Model" becomes a current speech input 1114. In fact, the speaker omitted a word "Markov" in a phrase "Hidden Markov Model" which was intended to speak, i.e., the word "Model" was immediately spoken after the word "Hidden" had been spoken. At 1120, a current utterance text "Model" corresponding to the current speech input 1114 may be identified.

Through comparing the current utterance text "Model" with the predicted subsequent utterance text sequence "Markov Model to evolve" included in the prompt 1144 in the speech recognition result 1140, it may be determined that the speaker may have omitted the predicted utterance text "Markov" in the prompt 1044. According to a strategy, the omitted word "Markov" may be used as a previous utterance text before the current utterance text "Model", so that it may be used for predicting a subsequent utterance text sequence. Accordingly, the prompt generation process at 740 in FIG. 7 may be adopted. For example, at 1130, a subsequent utterance text sequence "to evolve scenario" may be predicted based at least on the current utterance text "Model" and the omitted word "Markov" which is used as a previous utterance text. A speech recognition result 1150 corresponding to the current speech input 1114 may be provided, which comprises a current utterance text 1152, a first prompt part 1154, and a second prompt part 1156. The first prompt part 1154 comprises an indication "(Markov)" of the omitted word, and the second prompt part 1156 comprises a predicted subsequent utterance text sequence "to evolve scenario".

It should be understood that, according to specific application requirements and designs, the above examples described in conjunction with FIG. 8 to FIG. 11 may be modified or combined in any approach. Moreover, depending on specific application scenarios, speech recognition results in these examples may be provided to, e.g., terminal users, platform users, etc.

Figure 12:
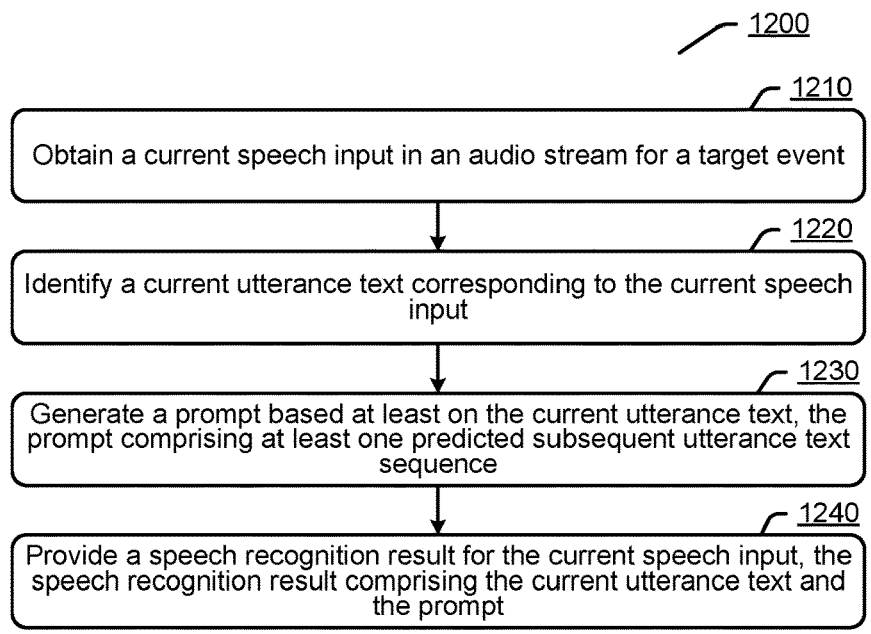
FIG. 12 illustrates a flowchart of an exemplary method for providing prompts in speech recognition results in real time according to an embodiment.

FIG. 12 illustrates a flowchart of an exemplary method 1200 for providing prompts in speech recognition results in real time according to an embodiment.

At 1210, a current speech input in an audio stream for a target event may be obtained.

At 1220, a current utterance text corresponding to the current speech input may be identified.

At 1230, a prompt may be generated based at least on the current utterance text, the prompt comprising at least one predicted subsequent utterance text sequence.

At 1240, a speech recognition result for the current speech input may be provided, the speech recognition result comprising the current utterance text and the prompt.

In an implementation, the current utterance text may comprise one or more words, and each predicted subsequent utterance text sequence may comprise one or more predicted subsequent utterance texts, and each predicted subsequent utterance text may comprise one or more words.

In an implementation, the prompt may be generated further based on at least one previous utterance text identified before the current utterance text.

In an implementation, the method 1200 may further comprise: obtaining an event ID of the target event and/or a speaker ID of a speaker of the current speech input. The prompt may be generated further based on the event ID and/or the speaker ID.

In an implementation, the generating a prompt may comprise: predicting, through a previously-established prompt generator, the at least one predicted subsequent utterance text sequence based at least on the current utterance text.

The prompt generator may be based on a neural network model.

The prompt generator may be based on a relevance matrix. The relevance matrix may comprise a plurality of text items and relevance values among the plurality of text items. The predicting the at least one predicted subsequent utterance text sequence may comprise: selecting, based at least on the current utterance text, at least one text item sequence highest ranked by relevance from the plurality of text items.

The method 1200 may further comprise: obtaining at least one document associated with the target event; and establishing the prompt generator based at least on the at least one document.

The method 1200 may further comprise: obtaining event information associated with the target event, the event information comprising at least one of: an event ID of the target event, time information of the target event, agenda of the target event, participant IDs of participants of the target event, and a speaker ID of a speaker associated with the at least one document. The prompt generator may be established further based on the event information.

The method 1200 may further comprise: obtaining a plurality of documents associated with a plurality of events and/or a plurality of speakers; and establishing the prompt generator based at least on the plurality of documents. The method 1200 may further comprise: obtaining event information associated with the plurality of events respectively and/or a plurality of speaker IDs corresponding to the plurality of speakers respectively. The prompt generator may be established further based on the event information and/or the plurality of speaker IDs.

In an implementation, the current utterance text and the prompt may be provided in different presentation approaches.

In an implementation, the method 1200 may further comprise: obtaining a second speech input subsequent to the current speech input in the audio stream; identifying a second utterance text corresponding to the second speech input; comparing the second utterance text with the at least one predicted subsequent utterance text sequence; generating a second prompt based at least on the second utterance text and/or a result of the comparison; and providing a speech recognition result for the second speech input, the speech recognition result comprising the second utterance text and the second prompt.

In an implementation, the method 1200 may further comprise: determining relevant information of the current utterance text and/or the prompt. The speech recognition result may further comprise the relevant information.

It should be understood that the method 1200 may further comprise any step/process for providing prompts in speech recognition results in real time according to the embodiments of the present disclosure as described above.

Figure 13:
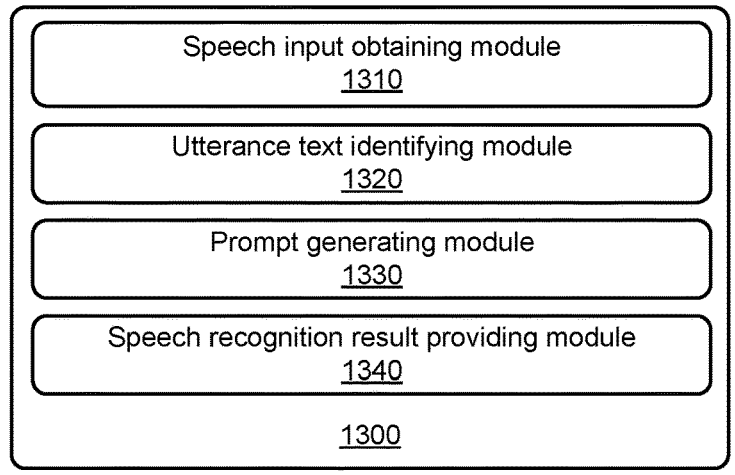
FIG. 13 illustrates an exemplary apparatus for providing prompts in speech recognition results in real time according to an embodiment.

FIG. 13 illustrates an exemplary apparatus 1300 for providing prompts in speech recognition results in real time according to an embodiment.

The apparatus 1300 may comprise: a speech input obtaining module 1310, for obtaining a current speech input in an audio stream for a target event; an utterance text identifying module 1320, for identifying a current utterance text corresponding to the current speech input; a prompt generating module 1330, for generating a prompt based at least on the current utterance text, the prompt comprising at least one predicted subsequent utterance text sequence; and a speech recognition result providing module 1340, for providing a speech recognition result for the current speech input, the speech recognition result comprising the current utterance text and the prompt.

In an implementation, the apparatus 1300 may further comprise: an identity obtaining module, for obtaining an event identity (ID) of the target event and/or a speaker ID of a speaker of the current speech input. The prompt may be generated further based on the event ID and/or the speaker ID.

In an implementation, the prompt generating module may be for: predicting, through a previously-established prompt generator, the at least one predicted subsequent utterance text sequence based at least on the current utterance text.

The apparatus 1300 may further comprise: a document obtaining module, for obtaining at least one document associated with the target event; and a prompt generator establishing module, for establishing the prompt generator based at least on the at least one document.

Moreover, the apparatus 1300 may further comprise any other module that performs steps of the methods for providing prompts in speech recognition results in real time according to the embodiments of the present disclosure as described above.

Figure 14:
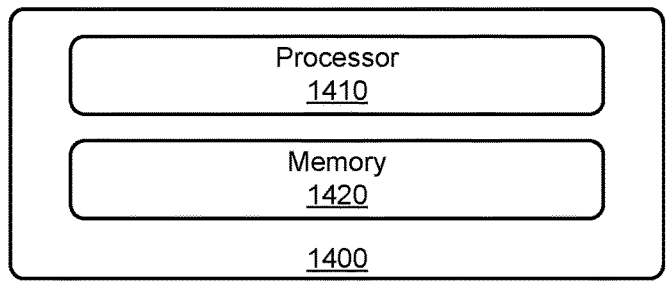
FIG. 14 illustrates an exemplary apparatus for providing prompts in speech recognition results in real time according to an embodiment.

FIG. 14 illustrates an exemplary apparatus 1400 for providing prompts in speech recognition results in real time according to an embodiment.

The apparatus 1400 may comprise: at least one processor 1410; and a memory 1420 storing computer-executable instructions. When the computer-executable instructions are executed, the at least one processor 1410 may: obtain a current speech input in an audio stream for a target event; identify a current utterance text corresponding to the current speech input; generate a prompt based at least on the current utterance text, the prompt comprising at least one predicted subsequent utterance text sequence; and provide a speech recognition result for the current speech input, the speech recognition result comprising the current utterance text and the prompt. Moreover, the processor 1410 may further perform any other step/process of the methods for providing prompts in speech recognition results in real time according to the embodiments of the present disclosure as described above.

The embodiments of the present disclosure may be embodied in a non-transitory computer-readable medium. The non-transitory computer-readable medium may comprise instructions that, when executed, cause one or more processors to perform any operations of the methods for providing prompts in speech recognition results in real time according to the embodiments of the present disclosure as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may comprise, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for providing prompts in speech recognition results in real time, comprising:
    obtaining a current speech input in an audio stream for a target event;
    identifying a current utterance text corresponding to the current speech input;
    evaluating a corpus of documents associated with the target event using text analysis to generate a relevance matrix for the corpus of documents;
    training a prompt generation recurrent neural network model using training data comprising a plurality of word sequences extracted from a plurality of documents associated with a plurality of target events to generate a prompt based at least on the current utterance text, the prompt comprising at least one predicted subsequent utterance text sequence comprising words selected from the relevance matrix based on respective absolute values among the words, wherein an order of the words of the at least one predicted subsequent utterance text sequence is determined using raw values among the words; and providing a speech recognition result for the current speech input, the speech recognition result comprising the current utterance text and the prompt.

2. The method of claim 1, wherein
the current utterance text comprises one or more words, and
each predicted subsequent utterance text sequence comprises one or more predicted subsequent utterance texts, and each predicted subsequent utterance text comprises one or more words.

3. The method of claim 1, wherein
the prompt is generated further based on at least one previous utterance text identified before the current utterance text.

4. The method of claim 1, further comprising:
obtaining an event identity (ID) of the target event and/or a speaker ID of a speaker of the current speech input,
wherein the prompt is generated further based on the event ID and/or the speaker ID.

5. The method of claim 1, wherein the generating a prompt comprises:
predicting, through a previously-established prompt generator, the at least one predicted subsequent utterance text sequence based at least on the current utterance text.

6. The method of claim 5, wherein
the prompt generator is based on a relevance matrix.

7. The method of claim 6, wherein
the relevance matrix comprises a plurality of text items and relevance values among the plurality of text items, and
the predicting the at least one predicted subsequent utterance text sequence comprises:
selecting, based at least on the current utterance text, at least one text item sequence highest ranked by relevance from the plurality of text items.

8. The method of claim 5, further comprising:
obtaining at least one document associated with the target event; and
establishing the prompt generator based at least on the at least one document.

9. The method of claim 8, further comprising:
obtaining event information associated with the target event, the event information comprising at least one of: an event identity (ID) of the target event, time information of the target event, agenda of the target event, participant IDs of participants of the target event, and a speaker ID of a speaker associated with the at least one document.

10. The method of claim 5, further comprising:
obtaining a plurality of documents associated with a plurality of events and/or a plurality of speakers; and
establishing the prompt generator based at least on the plurality of documents.

11. The method of claim 10, further comprising:
obtaining event information associated with the plurality of events respectively and/or a plurality of speaker identities (IDs) corresponding to the plurality of speakers respectively,
wherein the prompt generator is established further based on the event information and/or the plurality of speaker IDs.

12. The method of claim 1, further comprising:
obtaining a second speech input subsequent to the current speech input in the audio stream;
identifying a second utterance text corresponding to the second speech input;
comparing the second utterance text with the at least one predicted subsequent utterance text sequence;
generating a second prompt based at least on the second utterance text and/or a result of the comparison; and
providing a speech recognition result for the second speech input, the speech recognition result comprising the second utterance text and the second prompt.

13. An apparatus for providing prompts in speech recognition results in real time, comprising:
at least one processor; and
a memory storing computer-executable instructions that, when executed, cause the at least one processor to:
obtain a current speech input in an audio stream for a target event,
identify a current utterance text corresponding to the current speech input,
evaluating a corpus of documents associated with the target event using text analysis to generate a relevance matrix for the corpus of documents,
train a prompt generation recurrent neural network model using training data comprising a plurality of word sequences extracted from a plurality of documents associated with a plurality of target events to generate a prompt based at least on the current utterance text, the prompt comprising at least one predicted subsequent utterance text sequence comprising words selected from the relevance matrix based on respective absolute values among the words, wherein an order of the words of the at least one predicted subsequent utterance text sequence is determined using raw values among the words, and
provide a speech recognition result for the current speech input, the speech recognition result comprising the current utterance text and the prompt.

14. The apparatus of claim 13, the instructions to generate a prompt further comprising instructions to:
predict, through a previously-established prompt generator, the at least one predicted subsequent utterance text sequence based at least on the current utterance text.

15. The apparatus of claim 14, wherein the prompt generator is based on a relevance matrix.

16. The apparatus of claim 15, wherein the relevance matrix comprises a plurality of text items and relevance values among the plurality of text items, and the instructions to predict the at least one predicted subsequent utterance text sequence further comprising instructions to:
select, based at least on the current utterance text, at least one text item sequence highest ranked by relevance from the plurality of text items.

17. At least one non-transitory machine-readable medium comprising instructions for providing prompts in speech recognition results in real time that, when executed by at least one processor, cause the at least one processor to:
obtain a current speech input in an audio stream for a target event;
identify a current utterance text corresponding to the current speech input;
evaluating a corpus of documents associated with the target event using text analysis to generate a relevance matrix for the corpus of documents;
train a prompt generation recurrent neural network model using training data comprising a plurality of word sequences extracted from a plurality of documents associated with a plurality of target events to generate a prompt based at least on the current utterance text, the prompt comprising at least one predicted subsequent utterance text sequence comprising words selected from the relevance matrix based on respective absolute values among the words, wherein an order of the words of the at least one predicted subsequent utterance text sequence is determined using raw values among the words; and provide a speech recognition result for the current speech input, the speech recognition result comprising the current utterance text and the prompt.

18. The at least one non-transitory machine-readable medium of claim 17, the instructions to generate a prompt further comprising instructions to:

predict, through a previously-established prompt generator, the at least one predicted subsequent utterance text sequence based at least on the current utterance text.

* * * * *